United States Patent [19]

Andersson

[11] Patent Number: 5,631,431
[45] Date of Patent: May 20, 1997

[54] PARTICULATE CAF$_2$ AGENT FOR IMPROVING THE MACHINABILITY OF SINTERED IRON-BASED POWDER

[75] Inventor: Owe Andersson, Viken, Sweden

[73] Assignee: Höganäs AB, Hoganas, Sweden

[21] Appl. No.: 343,504

[22] PCT Filed: May 27, 1993

[86] PCT No.: PCT/SE93/00468
§ 371 Date: Nov. 23, 1994
§ 102(e) Date: Nov. 23, 1994

[87] PCT Pub. No.: WO93/24260
PCT Pub. Date: Dec. 9, 1993

[30] Foreign Application Priority Data

May 27, 1992 [SE] Sweden ............... 9201678

[51] Int. Cl.$^6$ ................ C22C 38/00
[52] U.S. Cl. ............ 75/230; 75/231; 75/246; 75/252; 419/38
[58] Field of Search ............ 75/231, 230, 246, 75/252; 419/37, 38

[56] References Cited

U.S. PATENT DOCUMENTS

| | | | |
|---|---|---|---|
| 3,297,571 | 1/1967 | Bonis | 252/12 |
| 3,419,363 | 12/1968 | Sliney | 29/182.1 |
| 4,214,905 | 7/1980 | Sliney | 75/200 |
| 4,256,489 | 3/1981 | Van Wyk | 75/173 R |
| 4,274,876 | 6/1981 | Kodama et al. | 75/243 |
| 4,345,943 | 8/1982 | Takahashi et al. | 75/238 |
| 4,348,232 | 9/1982 | Hiraoka et al. | 75/238 |
| 4,546,737 | 10/1985 | Kazuoka et al. | 123/188 S |
| 4,671,491 | 6/1987 | Kuroishi et al. | 251/368 |
| 4,724,000 | 2/1988 | Larson et al. | 75/236 |
| 4,836,848 | 6/1989 | Mayama et al. | 75/231 |
| 4,915,735 | 4/1990 | Motooka | 75/231 |
| 4,970,049 | 11/1990 | Baker et al. | 419/11 |
| 5,007,956 | 4/1991 | Fujita et al. | 75/238 |
| 5,125,811 | 6/1992 | Amano et al. | 418/179 |
| 5,273,570 | 12/1993 | Sato et al. | 75/231 |
| 5,326,526 | 7/1994 | Ikenoue et al. | 419/38 |
| 5,332,422 | 7/1994 | Rao | 75/252 |
| 5,346,529 | 9/1994 | Pettersson | 75/252 |
| 5,434,210 | 7/1995 | Rangaswamy et al. | 524/406 |

FOREIGN PATENT DOCUMENTS

| | | |
|---|---|---|
| 0277239 | 8/1988 | European Pat. Off. |
| 53-123314 | 10/1978 | Japan |
| 62-164850 | 1/1988 | Japan |
| 63-42348 | 2/1988 | Japan |
| 63-423348 | 2/1988 | Japan |
| 885319 | 11/1981 | Russian Federation |
| 1114704 | 9/1984 | Russian Federation |
| 1481262 | 5/1989 | Russian Federation |

OTHER PUBLICATIONS

Patent Abstracts of Japan, "Sintered Steedl Excellent in Machinability", vol. 12, No. 391, C–537, Kawasaki Steel Corp., Takeo Omura, Abstract of JP, A, 63–137137, Jun. 9, 1988.

*Primary Examiner*—Charles T. Jordan
*Assistant Examiner*—Chrisman D. Carroll
*Attorney, Agent, or Firm*—Burns, Doane, Swecker & Mathis, L.L.P.

[57] ABSTRACT

The invention relates to an additive for improving the machinability of iron-based powder compositions. The additive contains calcium fluoride particles which are included in an amount of 0.1–0.6% by weight in the powder composition. The invention further relates to powder compositions containing the additives indicated, as well as sintered products produced from the powder compositions.

14 Claims, 2 Drawing Sheets

PARTICULATE CAF$_2$ AGENT FOR IMPROVING THE MACHINABILITY OF SINTERED IRON-BASED POWDER

FIELD OF THE INVENTION

The present invention relates to a machinability-improving powder to be added to an iron-based powder composition for use in powder-metallurgical manufacture of components.

BACKGROUND OF THE INVENTION

Powder-metallurgical manufacture of components often involves the following process steps. A base powder, generally an iron or steel powder, is admixed with alloying elements, such as nickel, copper, molybdenum and carbon, in the form of a powder, and a lubricant. The powder mixture is thereafter compacted in a press tool yielding what is known as a green body of almost final geometry. After compacting, the compact is sintered so as to obtain its final strength, hardness, elongation etc.

One of the major advantages of powder-metallurgical manufacture of components is that it becomes possible, by compacting and sintering, to produce blanks of final or very close to final shape. There are however instances where subsequent machining is required. For example, this may be necessary because of high tolerance demands or because the final component has such a shape that it cannot be pressed directly but requires machining after sintering. More specifically, geometries such as holes transverse to the compacting direction, undercuts and threads, call for subsequent machining.

By continuously developing new sintered steels of higher strength and thus also higher hardness, machining has become one of the major problems in powder-metallurgical manufacture of components. It is often a limiting factor when assessing whether powder-metallurgical manufacture is the most cost-effective method for manufacturing a component. Hence, there is a great need for new and more effective additives to improve the machinability of sintered steels. It then is important that this additive does not appreciably affect the mechanical properties, such as tensile strength and elongation, of the sintered material.

Today, there are a number of known substances which are added to iron-based powder mixtures to facilitate the machining of components after sintering.

The commonest powder additive is MnS, which is mentioned e.g. in EP 0 183 666, describing how the machinability of a sintered steel is improved by the admixture of such powder. Materials which are difficult to machine, in this context materials having a hardness above about 180 HV, cannot however be machined properly by adding MnS. Moreover, the addition of MnS often entails an unacceptable reduction of the strength of the material after sintering.

U.S. Pat. No. 4,927,461 describes the addition of hexagonal BN (boron nitride) to iron-based powder mixtures to improve machinability after sintering. By agglomerating very fine BN powder (0.05–1.0 µm), it is possible to achieve a similar improvement of the machinability of iron-based powder mixtures after sintering as by the addition of MnS. However, the sintered strength is affected to a lesser extent if a correct amount of BN powder is added, than when adding MnS. As in the case of MnS, BN additions do however not make it possible in industrial production to machine materials having a hardness above 200 HV.

WO 91/14526 describes how small amounts of Te and/or Se together with MnS are used to improve the machinability about twice in powder-metallurgical materials that are difficult to machine. The addition of Te and/or Se is already conflicting with environmetal considerations, in that the hygienic limit values for these additives are very low and there is a tendency towards ever more stringent environmental regulations.

SUMMARY OF THE INVENTION

The invention provides an iron-based powder composition essentially free from hard phase material for compacting and sintering into products having enhanced machinability. The composition contains, in addition to iron, at least one of the alloying elements C, P, Cr, Mn, Cu, Ni and Mo. The iron-based powder contains 0.1–0.6% by weight of CaF$_2$ powder particles as agent for improving the machinability and such particles are unattached to graphite particles. In addition, the CaF$_2$ powder is optionally combined with one or more conventional machinability-improving agents and essentially no elementary sulphur is present in the agent(s) for improving the machinability of the sintered products.

According to various aspects of the invention, the powder composition can include 0.1–1.2% by weight C, 0–0.6% by weight P, 0–25% by weight Cr, 0–10% by weight Mn, 0–5% by weight Cu, 0–8% by weight Ni and 0–2% by weight Mo. The powder composition can contain 0.05–0.5%, preferably 0.1–0.3% by weight of MoS$_2$. The powder can contain free CaF$_2$ particles having an average particle size below 100 µm, preferably between about 20 µm and about 70 µm. The additional machinability-improving agent can be MnS in an amount of at most 30% by weight, preferably at most 15% by weight of the total weight of CaF$_2$.

The invention also provides a sintered product having enhanced machinability and being essentially free from hard phase material, the product containing 0.1–1.2% by weight C, 0–0.6% by weight P, 0–25% by weight Cr, 0–10% by weight Mn, 0–5% by weight Cu, 0–8% by weight Ni, 0–2% by weight Mo, and 0.1–0.6% by weight CaF$_2$. The CaF$_2$ is preferably present in the form of CaF$_2$ particles which are not attached to graphite particles.

DETAILED DESCRIPTION OF THE PREFERRED EMBODIMENTS

Figure 1:
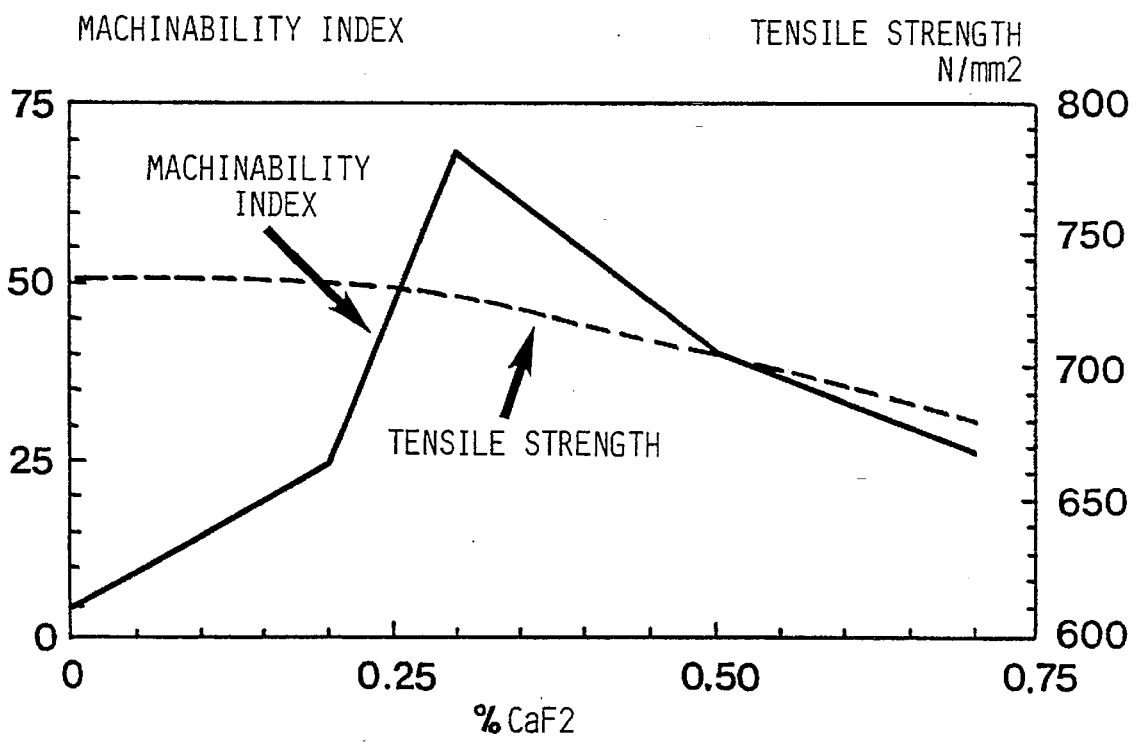
FIG. 1 shows the influence of the CaF$_2$ concentration on machinability and tensile strength with respect to a sintered product in accordance with the invention, the sintered product comprising a base material of Fe, 4% Ni, 1.5% Cu, 0.5% Mo and 0.5% C, the material having been sintered at 1120° C. for thirty minutes in an atmosphere of endogas.

One object of the present invention is to provide a powder to be added to an iron- or steel-based powder composition which after sintering gives improved machinability in the resulting components. In particular, the invention provides an agent improving the machinability of materials which are difficult to machine, in this context materials having a hardness above about 180 HV and a strength above about 700 MPa, and being essentially free from hard phase material.

Another object of the invention is to provide a machinability-improving agent which but to a small extent, or not at all, affects the mechanical properties, such as strength and dimensional change during sintering, of the sintered component, and which is essentially harmless to the environment.

It has been found that these objects can be achieved by admixing to an iron-based powder composition an agent containing calcium fluoride particles. According to the invention, these particles are essentially free (i.e. not attached to graphite particles, see below) and have an average particle size of less than 100 μm. Preferably, the average particle size ranges between 20 μm and 70 μm. If the particle size becomes too large, the strength of the sintered component will be adversely affected and the machinability-improving effect becomes unsatisfactory. Also when the powder additive is too fine, the machinability-improving effect becomes insufficient. The calcium fluoride particles may be of synthetic or natural origin. An especially preferred starting material is fine-grade fluorspar. The purity of the calcium fluoride also affects the machinability-improving effect, and it has been found that the content of impurities in the starting material used, such as fluorspar, should not exceed 3% by weight, preferably not over 2% by weight. According to the invention, the machinability-improving calcium-fluoride-containing powder is added to an iron or a steel powder in an amount of about 0.1–0.6%, preferably 0.15–0.6% and most preferably 0.2–0.5% by weight of the powder composition. For contents below 0.1% by weight of $CaF_2$, the machinability-improving effect becomes insufficient, whereas for contents above 0.6% by weight, $CaF_2$ will have an adverse effect on strength and dimensional change.

One field of use of systems with fluorine compounds based on $CaF_2$ involves solid lubricants for reducing the friction between surfaces which are loaded at room temperature and at elevated temperatures. This is reported in "Some Improvements in Solid Lubricants Coatings for High Temperature Operations", ASLE Transaction, Vol. 16/1, pp. 42–49. The use of calcium fluoride as a lubricant in powder-metallurgical materials with the primary aim of improving wear-resistance in sintered products, such as valve seats containing hard phase material, is also disclosed e.g. in U.S. Pat. No. 4,274,876, U.S. Pat. No. 4,836,848, JP-A-53-123314, SU 885-319, SU 1114-70, SU 1481-262, JP 63-42348 and EP 277 239.

SU 1585-069 teaches that additions of $CaF_2$ and S can be used for improving the machinability of powder-metallurgical materials, but the addition of $CaF_2$ is then very high (2–3%). Otherwise, S is well known for improving the machinability of both conventional and powder-metallurgical materials. This publication cannot thus be considered to be of any major guidance to anyone skilled in the art who intends to improve the machinability of powder-metallurgical materials, since S would then first have to be eliminated before essentially reducing the added amount of $CaF_2$. Even if the additive according to the present invention can be combined with other conventional machinability-improving additives, such as MnS, it preferably is essentially free from elementary sulphur which, in addition to being environmentally undesirable, has a marked effect on the dimensional change.

JP 63-137137 discloses the addition of $CaF_2$ to iron-based powder mixtures with a view to improving the machinability of the components obtained after sintering, i.e. the object is the same as in the present invention. According to this Japanese patent application, however, the calcium fluoride is not in free form when added to the iron or steel composition, but it must be completely or partly attached to graphite. The purpose of using fluoride attached to graphite is to prevent the graphite from completely dissolving in the iron matrix. The undissolved graphite then acts by forming a lubricating film between the tool and the material during machining. Furthermore, the Japanese application stipulates that relatively coarse carbon particles be added, which adversely affects the strength of the final component. Thus, the Japanese application does not in any way indicate that free calcium fluoride particles would give improved machinability. The advantages of the present invention over the invention according to the Japanese application is that, in the present invention, the step of fluoride absorbtion on carbon is dispensed with, since carbon need not be used at all in the invention, and if it is desirable to add carbon, finer carbon particles can be used, which entails comparatively improved strength.

In addition to the additives as such, the present invention also encompasses iron- or steel-based powder compositions containing the additives, as well as the sintered products produced from these compositions. It is preferred that these powder compositions are essentially free from hard phase material, since preliminary tests have shown that the agent according to the present invention does not exhibit any marked machinability-improving effect when hard phase material is included in the iron or steel compositions. As used herein, "hard phase material" relates to materials of non-metal having a hardness which essentially exceeds the hardness of alloyed metal, or exceeds 800 microvickers. Examples of hard phase materials are carbides, nitrides, oxides and borides.

The powder compositions according to the invention may, in addition to iron and additive, comprise other substances, such as C, P, Cr, Mn, Cu, Ni and/or Mo, which are traditionally included in this type of powder compositions. Preferably, these substances are included in the powder compositions in the following contents: 0.1–2%, preferably 0.1–1.2% by weight C, 0–0.6% by weight P, 0–25% by weight Cr, 0–10% by weight Mn, 0–5% by weight Cu, 0–8% by weight Ni, and 0–2% by weight Mo, the additive mentioned above being included in an amount of 0.1–0.6% by weight, preferably 0.15–0.6 and most preferably 0.2–0.5% by weight.

According to a particular aspect of the invention, $CaF_2$ is used in such known iron and steel compositions which, before the conception of the present invention, were admixed with sulphur for improved machinability. However, since sulphur causes swelling during sintering, whereas $CaF_2$ substantially does not affect the dimensions during this step, these known compositions can be admixed with another substance which, like sulphur, causes swelling during sintering. An example of such a swelling substance is $MoS_2$, which may make up 0.05–0.5% by weight, preferably 0.1–0.3% by weight of the iron-based composition.

The powder-metallurgical manufacture of components by means of the additive according to the invention is performed in a conventional manner, i.e. most often by the following process steps: The base powder, i.e. the iron or steel powder, is admixed with desired alloying elements, such as nickel, copper, molybdenum and optionally carbon as well as the additive according to the invention in powder form. This powder mixture is admixed with a conventional lubricant prior to compacting, for instance zinc stearate, which disappears during the subsequent sintering. Mixing is done to distribute the alloying elements homogeneously in the material. The powder mixture is thereafter compacted in a press tool yielding what is known as a green body of close to final geometry. Compacting generally takes place at a pressure of 400–800 MPa. Higher compacting pressures only give an insignificant increase of the density but essentially increased tool wear. Lower compacting pressures entail densities which are too low to be useful in most structural details. After compacting, the compact is sintered and is given its final strength, hardness, elongation, etc. Sintering must take place at a temperature above 1083° C. to make it possible to use Cu as an alloying element. In view of the rate of diffusion in the material and the minimising of the sintering time, a maximum temperature is preferred. However, most of the production furnaces can only cope with temperatures up to 1150° C. Today, the commonest sintering temperature is 1120° C. At this temperature, desirable properties are generally achieved after sintering for 30 min.

The present invention will be illustrated hereinafter in a few non-limitative Examples.

All the materials used in these Examples are commercially available from Höganäs AB, Sweden, except for $CaF_2$ which is a high-purity (99% $CaF_2$) fine-grade fluorspar supplied by Indesko AB, Sweden. The materials in the following Examples have all been compacted at 600 MPa to standardised tensile test bars according to ISO 2740-1973 and to discs having a diameter of 50 mm and a height of 12 mm. The materials were sintered in a laboratory mesh belt furnace at 1120° C. for 30 minutes in an endothermic atmosphere with a carbon potential corresponding to 0.5%. The test bars were used to determine tensile strength according to EN 10002-1, hardness according to ISO 6507/1-1992 and dimensional change. The discs were used in drill tests to determine the machinability index. This index is defined as the average number of holes which six identical drills can make through six discs before the drills are worn out. Drilling was performed with high-speed steel drills at a constant speed and a constant feed without any coolant.

EXAMPLE 1

Six different materials with compositions described in Table 1 were mixed with additions of either MnS or $CaF_2$ in order to evaluate the effects of the additives on the mechanical properties and machinability. The MnS used was a commercially available grade normally used for machinability-enhancing purposes. The $CaF_2$ was sieved on a 63 µm sieve, and the fine fraction was used. The materials were processed according to the description above, except for the Fe+0.6% P material, which was sintered in dissociated ammonia. As can be seen in Table 1, there is a larger improvement in machinability for the materials containing $CaF_2$ than for the materials containing MnS as compared with the reference. The tensile strength is significantly less affected by the $CaF_2$ addition than the MnS addition, and there is smaller dimensional change for the $CaF_2$ as compared with the reference.

EXAMPLE 2

A material Fe+4% Ni+1.5% Cu+0.5% Mo+0.5% C was mixed with different amounts of <63 µm $CaF_2$. The material was processed according to the description above, and machinability and tensile strength were measured. The material without any addition of $CaF_2$ had a tensile strength of 736 MPa, a hardness of 205 HV 10, and a machinability index of 4. The results are presented in FIG. 1. As can be seen in FIG. 1, the machinability is significantly increased when $CaF_2$ is added in the amounts falling within the scope of the invention. As can also be seen in FIG. 1, the tensile strength decreases with increasing amounts of $CaF_2$ down to a level which is unacceptable.

EXAMPLE 3

Figure 2:
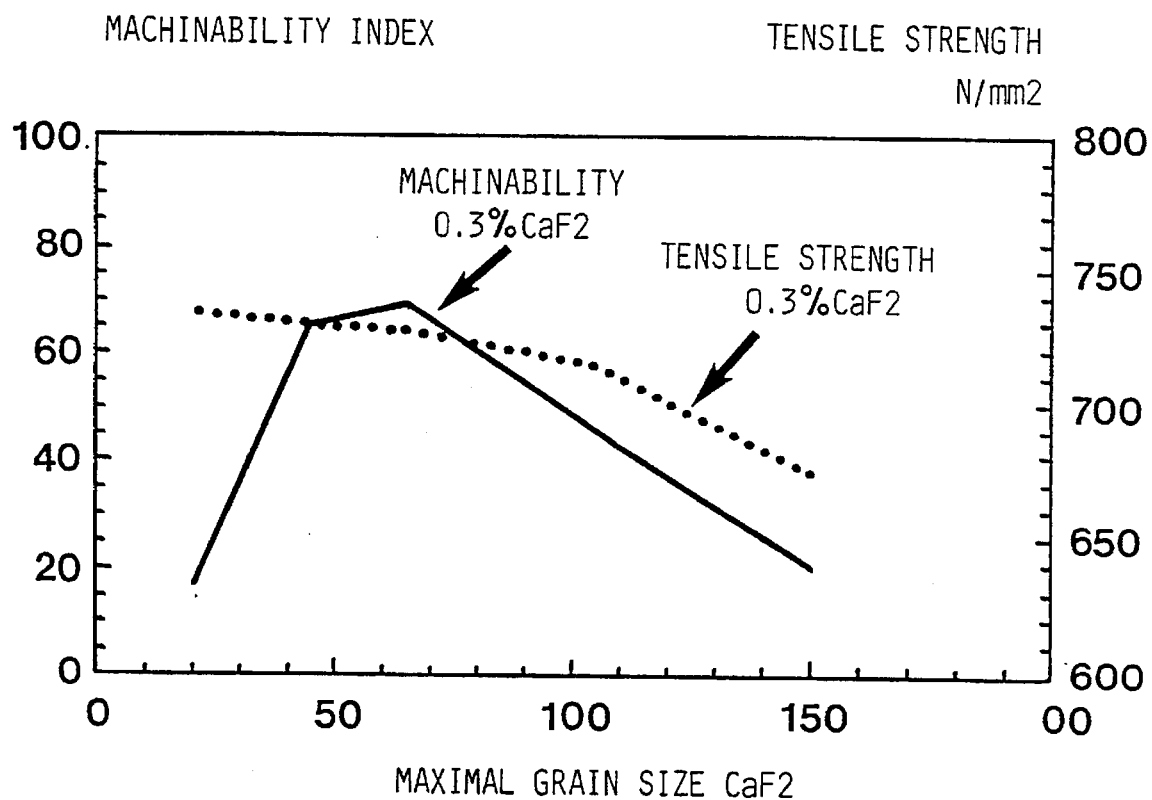
FIG. 2 shows the influence of the sieve fraction of CaF$_2$ on machinability and tensile strength with respect to the sintered product of FIG. 1.

A material Fe+4% Ni+1.5% Cu+0.5% Mo+0.5% C was mixed with 0.3% $CaF_2$ which was sieved to different particle or grain sizes. The maximum grain sizes were ranging from 20 µm to 150 µm. The materials were processed according to the description above, and machinability and tensile strength were measured and are presented in FIG. 2. The material without any addition of $CaF_2$ had a tensile strength of 736 MPa, a hardness of 205 HV 10, and a machinability index of 4. The machinability is highest when the maximum $CaF_2$ grain size is between 30 µm and 100 µm. The influence of tensile strength is decreasing with increasing maximum grain size, but it is not until the maximum grain size exceeds 140 µm that the drop in tensile strength becomes unacceptable. The average grain size ranges between half and ⅔ of the maximum grain size.

TABLE 1

| Material | dL % | SD g/cm³ | HV10 MPa | TS MPa | A % | Machinability |
| --- | --- | --- | --- | --- | --- | --- |
| Fe + 4% Ni + 1.5% Cu + 0.5% Mo + 0.5% C | −0.147 | 7.08 | 205 | 736 | 2.70 | 4 |
| Fe + 4% Ni + 1.55Cu + 0.5% Mo + 0.5% C + 0.5% MnS | −0.137 | 7.05 | 199 | 701 | 2.20 | 24 |
| Fe + 4% Ni + 1.5% Cu + 0.5% Mo + 0.5% C + 0.3% $CaF_2$ | −0.145 | 7.06 | 202 | 728 | 2.40 | 68 |
| Fe + 0.5% Mo + 2% Ni + 0.5% C | −0.327 | 7.07 | 183 | 633 | 2.60 | 10 |
| Fe + 0.5% Mo + 2% Ni + 0.5% C + 0.5% MnS | −0.32 | 7.05 | 183 | 565 | 1.90 | 104 |
| Fe + 0.5% Mo + 2% Ni + 0.5% C + 0.3% $CaF_2$ | −0.333 | 7.06 | 184 | 606 | 2.40 | 109 |
| Fe + 0.5% Mo + 2% Cu + 0.5% C | 0.078 | 7.00 | 180 | 615 | 2.50 | 17 |
| Fe + 0.5% Mo + 2% Cu + 0.5% C + 0.5% MnS | 0.154 | 6.95 | 170 | 560 | 2.20 | 112 |
| Fe + 0.5% Mo + 2% Cu + 0.5% C + 0.3% $CaF_2$ | 0.104 | 6.97 | 178 | 605 | 2.60 | 106 |
| Fe + 0.5% Mo + 4% Ni + 2% Cu + 0.5% C | −0.157 | 7.05 | 234 | 903 | 2.30 | 1 |
| Fe + 0.5% Mo + 4% Ni + 2% Cu + 0.5% C + 0.5% MnS | −0.139 | 7.01 | 220 | 814 | 1.90 | 3 |
| Fe + 0.5% Mo + 4% Ni + 2% Cu + 0.5% C + 0.3% $CaF_2$ | −0.158 | 7.03 | 234 | 895 | 1.90 | 3 |
| Fe + 0.6% P | −0.849 | 7.23 | 124.4 | 432 | 14.60 | 12 |
| Fe + 0.6% P + 0.5% MnS | −0.859 | 7.19 | 122.8 | 406 | 11.50 | 106 |
| Fe + 0.6% P + 0.3% $CaF_2$ | −0.85 | 7.2 | 125.2 | 418 | 12.20 | 112 |
| Fe + 1.75% Ni + 1.5% Cu + 0.5% Mo + 0.5% C | −0.04 | 7.06 | 171 | 632 | 3.00 | 24 |
| Fe + 1.75% Ni + 1.5% Cu + 0.5% Mo + 0.5% C + 0.5MnS | −0.03 | 7.04 | 171 | 597 | 2.60 | 190 |
| Fe + 1.75% Ni + 1.5% Cu + 0.5% Mo + 0.5% C + 0.3$CaF_2$ | −0.05 | 7.04 | 175 | 618 | 3.00 | 224 | dL is the change in length for the tensile strength bar during sintering in percent
SD is the sintered density for the tensile strength bar in g/cm³
HV10 is the Vickers hardness for the tensile strength bar
TS is the tensile strength for the tensile strength bar in MPa
A is the plastic elongation during the tensile strength test of a 25 mm long section of the tensile strength bar in percent
Machinability is the average number of holes it is possible to drill in a disc of the material with one drill

What is claimed is:

1. An iron-based powder composition essentially free from hard phase material for compacting and sintering into products having enhanced machinability, said composition comprising, in addition to iron, at least one of the alloying elements C, P, Cr, Mn, Cu, Ni and $\leq 2\%$ by weight Mo, the iron-based powder including 0.1–0.6% by weight of $CaF_2$ powder particles as agent for improving the machinability, the particles of the $CaF_2$ powder being unattached to graphite particles, the $CaF_2$ powder being optionally combined with one or more conventional machinability-improving agents and essentially no elementary sulfur being present in the agent(s) for improving the machinability of the sintered products.

2. A powder composition as claimed in claim 1, wherein the alloying elements are included in the following contents, based on the weight of the composition: 0.1–1.2% by weight C, 0–0.6% by weight P, 0–25% by weight Cr, 0–10% by weight Mn, 0–5% by weight Cu, 0–8% by weight Ni and 0–2% by weight Mo.

3. A powder composition as claimed in claim 2, including 0.05–0.5% by weight of $MoS_2$.

4. A powder composition according to claim 1, wherein the iron-based powder contains free $CaF_2$ particles having an average particle size below 100 μm.

5. A powder composition according to claim 1, wherein the additional machinability-improving agent is MnS in an amount of at most 30% by weight of the total weight of $CaF_2$.

6. A sintered product having enhanced machinability and being essentially free from hard phase material, said product comprising 0.1–1.2% by weight C, 0–0.6% by weight P, 0–25% by weight Cr, 0–10% by weight Mn, 0–5% by weight Cu, 0–8% by weight Ni, and 0–2% by weight Mo, as well as 0.1–0.6% by weight $CaF_2$ and a balance of iron or steel.

7. The sintered product of claim 6, wherein the $CaF_2$ is present in the form of $CaF_2$ particles which are not attached to graphite particles, the $CaF_2$ particles improve machinability of the sintered product and the sintered product is essentially free from hard phase material.

8. The sintered product of claim 6, made by adding $CaF_2$ particles which are not attached to graphite particles to an iron or steel powder which is essentially free from hard phase material to form a powder mixture, compacting the powder mixture to a green body, and sintering the green body.

9. A powder composition as claimed in claim 1, wherein the iron-based powder contains 0.15–0.6% by weight of $CaF_2$ powder particles.

10. A powder composition as claimed in claim 1, wherein the iron-based powder contains 0.2–0.5% by weight of $CaF_2$ powder particles.

11. A powder composition as claimed in claim 2, including 0.1–0.3% by weight of $MoS_2$.

12. A powder composition as claimed in claim 1, wherein the iron-based powder contains free $CaF_2$ particles having an average particle size between about 20 μm and about 70 μm.

13. A powder composition as claimed in claim 1, wherein the additional machinability-improving agent is MnS in an amount of at most 15% by weight of the total weight of $CaF_2$.

14. The sintered product of claim 6, having a hardness of $\leq 234$ HV10.

* * * * *